Nov. 18, 1941.   J. H. WILSON   2,263,153
ADJUSTING DEVICE FOR CLUTCH ELEMENTS AND THE LIKE
Filed Oct. 3, 1939   2 Sheets-Sheet 1
FIG. 1.
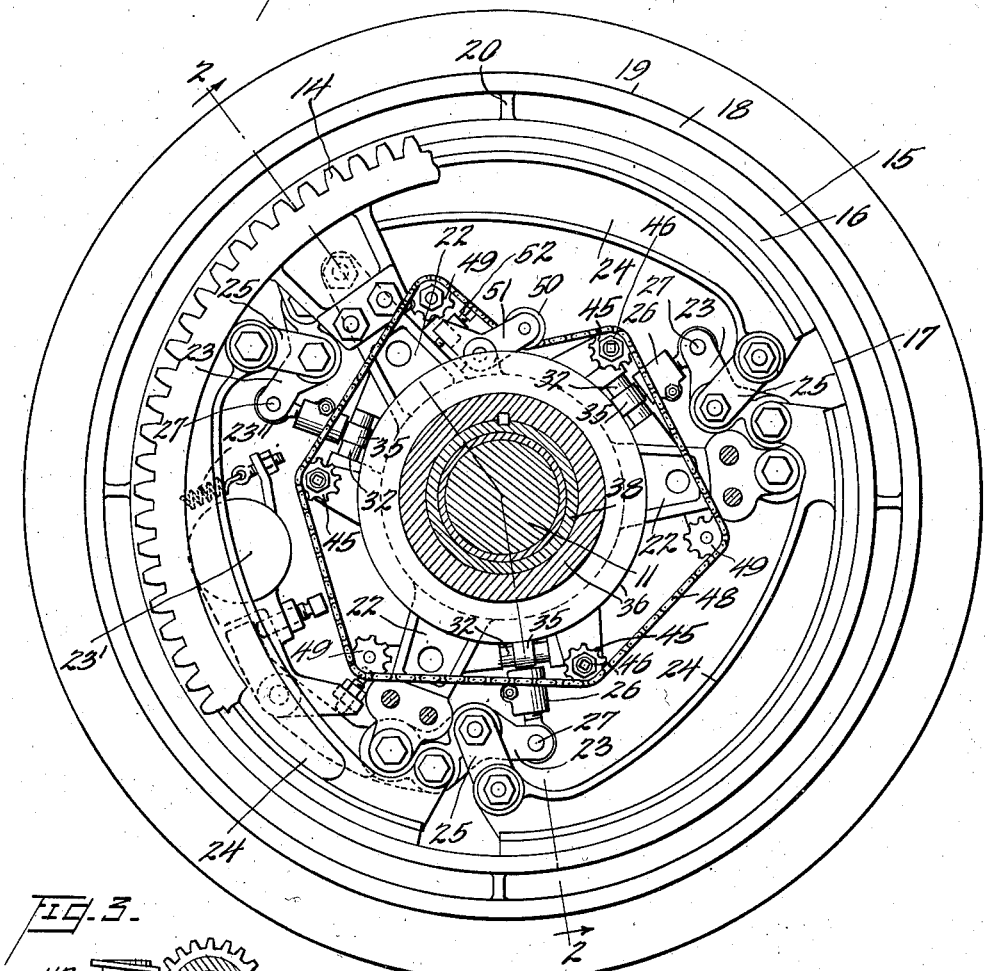
FIG. 3.
FIG. 4.
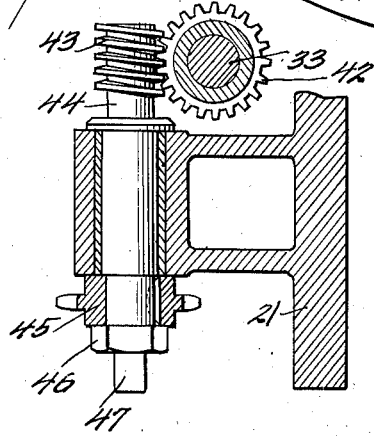
Inventor
J. H. Wilson
By Watson, Cole, Grindle & Watson
Attorney

UNITED STATES PATENT OFFICE 2,263,153

ADJUSTING DEVICE FOR CLUTCH ELEMENTS AND THE LIKE

John Hart Wilson, Wichita Falls, Tex.

Application October 3, 1939, Serial No. 297,763

5 Claims. (Cl. 192—111)

This invention relates to friction clutches and the like, and more particularly to novel and convenient means for adjusting the relationship of the friction elements in a clutch or brake mechanism, and constitutes an improvement upon the friction clutch described and illustrated in my copending application Serial No. 222,514.

The features and advantages of the particular type of clutch mechanism embodied in the present disclosure are fully set forth in said copending application and need not be more fully described herein. In addition, the novel features of the present invention may be applied to other mechanisms than that described in the aforesaid application, and the present invention is not limited to use in connection with clutches and brakes, although the principal usefulness of the invention, so far as I am now aware, lies in that field, and particularly in the field of internal expanding brakes and clutches.

Most types of internal expanding clutches and brakes comprise a driven member having an internal clutch or brake surface, and a plurality of friction elements, lying within the space defined by such surface and adapted to be moved outwardly into engagement therewith. It is essential to the proper operation of such devices that the several friction elements shall engage the cylindrical clutch or brake surface simultaneously and uniformly, that is, with substantially equal pressure. In the course of time, as the cooperating surfaces and the operating mechanism are subjected to wear, it becomes necessary to adjust the friction elements in order that they may continue to engage the clutch or brake surface with the requisite pressure. If the mechanism is properly constructed, the wear on the several friction elements and their operating linkages will be substantially equal, and the necessary adjustments should likewise be substantially equal.

It is the general object of the present invention to provide means whereby the several friction elements of an expanding brake or clutch, or similar mechanism, may be adjusted equally and simultaneously, with minimum effort and maximum convenience.

A further object of the present invention is the provision of adjusting means of the type described, so arranged that when the position of one friction element is adjusted manually, a corresponding adjustment is automatically effected upon the remaining friction elements.

Another object is the provision of adjusting means comprising a plurality of eccentrically mounted pivots on which the cam levers for the several friction elements are carried, and means for simultaneously and uniformly rotating said eccentric pivots in order to altar the throw of the cam levers simultaneously and uniformly.

A further object is the provision of adjusting means as described above including a plurality of shafts, one for each friction element, said shafts having toothed engagement with said eccentric pivots and being interconnected by means of a sprocket chain or the like, whereby when one of said shafts is rotated to adjust its associated friction element, the remaining shafts are correspondingly rotated to effect a like adjustment in the position of their respective associated friction elements.

A further object is the provision, on at least one of said shafts, of means affording a tool engaging portion, whereby the same may be gripped and rotated by means of a wrench or similar tool.

Other and further objects, features and advantages of the present invention will be apparent to one skilled in the art from the following description taken in connection with the accompanying drawings in which:

Figure 1 is a vertical transverse section through a clutch provided with adjusting means according to the present invention, the internal mechanism being shown in elevation;

Figures 3 and 4 are detailed sectional views, on an enlarged scale, illustrating the eccentric pivot associated with each friction element and the means for rotating said pivots.

Figure 2:
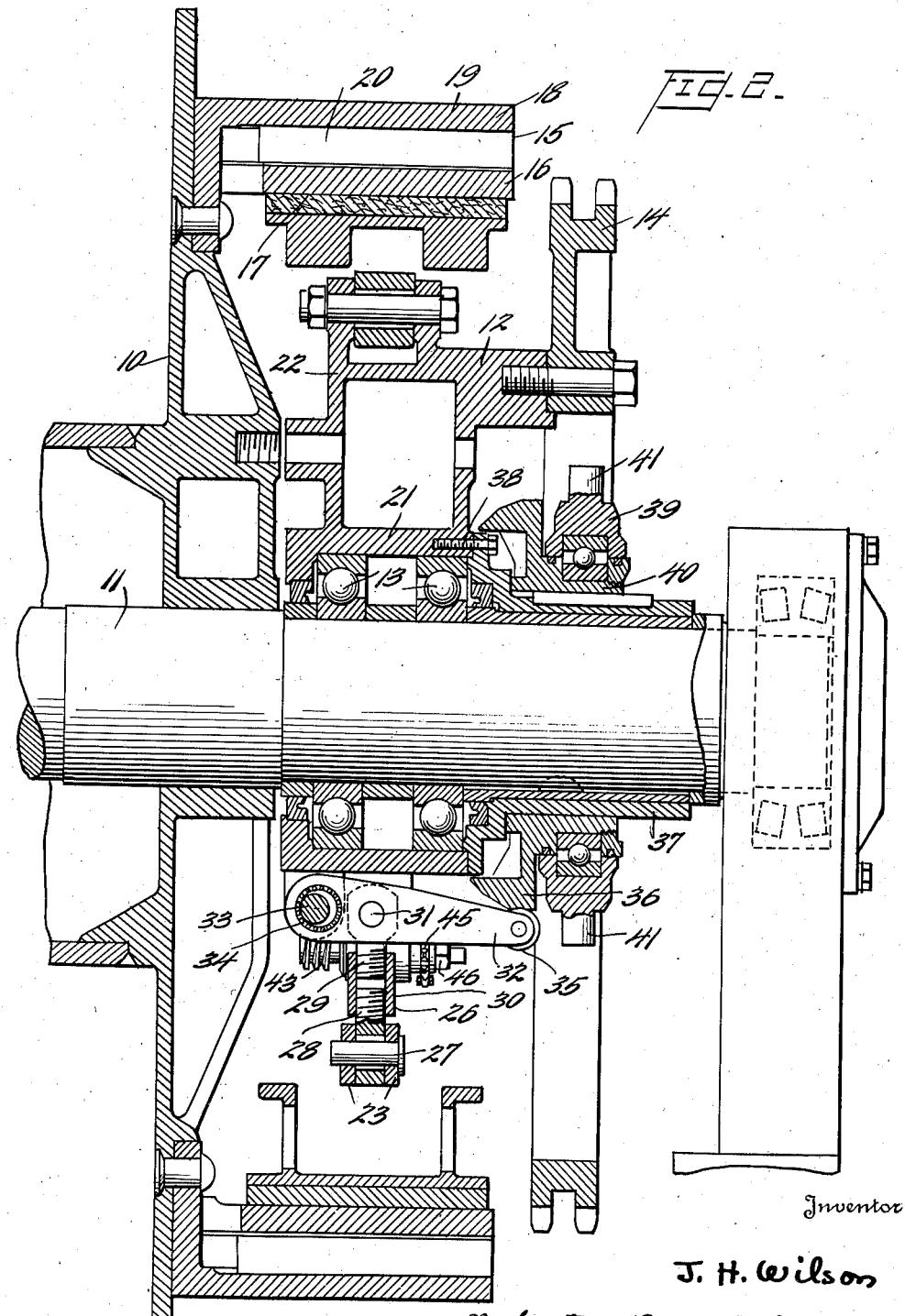
Figure 2 is a section on line 2—2 of Figure 1.

In order to facilitate an understanding of the invention, reference is made to the embodiment thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

Referring to Figures 1 and 2, the internal expanding clutch illustrated therein is generally similar to that described and illustrated in my aforesaid copending application, and comprises generally a driven member 10, secured on a shaft 11, and a driving member 12 journalled on the shaft 11 by means of anti-friction bearings 13. The driving member 12 is provided with a toothed portion 14 for engagement with a sprocket chain (not shown), which may be driven by any suitable external source of power. In the present instance toothed portion 14 of the driving member comprises a separate member bolted to the driving member 12.

The driven member 10 may, for example, comprise a pulley, drum, or other desired driven member, and is provided with a cylindrical portion 15, which may be formed integrally therewith or secured thereto in any suitable manner. The cylindrical portion 15, may, for example, comprise an inner member 16 having an internal clutch surface 17, and an outer member 18 provided with a braking surface 19, the inner and outer members being connected by spaced webs 20. The driving member 12 comprises a hub 21 having a plurality of radial arms 22 on each of which is pivoted a lever 23, three such radial arms 22 and levers 23 being provided in the illustrated embodiment. Each of the three friction elements 24 is connected between adjacent levers 23, as more fully described in my aforesaid application, the trailing end of each friction element being pivotally connected to the adjacent lever 23, while the leading end of the next friction element is connected to the same lever 23 through a link 25. Suitable means, such as centrifugal members 23' and springs 23" are employed for normally maintaining the levers 23 in the position in which the friction elements 24 are disengaged from the clutch surface 17. This arrangement is seen in Figure 1, only one weight 23' and spring 23" being illustrated, the remainder being omitted for the sake of clarity.

A compression member 26 is pivoted at the rearward extremity of each lever 23, as at 27 (Figure 1), and comprises two oppositely threaded portions 28 and 29 (Figure 2) connected by an oppositely threaded split nut 30, for adjusting the length of the compression member. The inner threaded portion 29 is pivoted, as at 31, to a cam lever 32 which in turn is mounted on eccentric pivot 33, journalled on the hub 21 of the driving member, as shown in Figure 4. Preferably, anti-friction means such as the small rollers or needles 34 are disposed between the cam lever 32 and the eccentric pivot 33.

Each cam lever 32 is provided at its distal end with a cam follower roller 35, for engagement with a slidable inclined annular cam 36. The latter is splined to a sleeve 37 which rotates with the hub 31, being bolted thereto as at 38 (Figure 2). The cam 36 may be shifted axially of the shaft 11, to engage and disengage the clutch, by means of a shifter yoke 39 journalled on an annular flange 40 of the cam 36, the yoke 39 being provided with suitable trunnions 41 for engagement with a manually operated lever, not shown.

From the foregoing description it will be apparent that when the cam 36 is moved to the left in Figure 2 the cam levers 32 will be rocked outwardly, thus causing the compression members 26 to rock the levers 23, which in turn causes the friction elements 24 to engage the clutch surface 17, as more fully described in my aforesaid copending application. As the friction surfaces of the friction elements 24, and the bearing surfaces in the associated linkages, become worn through use, it becomes necessary to alter the throw of the cam levers 32 so as to cause the compression members 26 to be moved further outwardly when the clutch is to be engaged. This adjustment may be effected by rotating the several eccentric pivots 33 in such a manner as to move the pivoted ends of the cam levers 32 outwardly from the hub 21. This rotation of the eccentric pivots 33 may be effected in the manner and by the mechanism which will now be described.

Referring to Figures 3 and 4, each eccentric pivot 33 is provided on one end with a worm wheel 42 for engagement with a worm 43 formed on a short shaft 44 journalled on the hub 21. The shaft 44 is provided, at its opposite end, with a small sprocket 45, which may be secured in place by a nut 46. The end of the shaft 44 projecting beyond the nut 46 may be squared or otherwise suitably configured to form a tool engaging portion 47.

An endless sprocket chain 48 (Figure 1) engages each of the sprockets 45 and is supported, intermediate said sprockets, on idler sprockets 49, journalled on brackets extending laterally from the radial arms 22. Another sprocket 50, journalled on a bell crank lever 51, is employed for maintaining the desired degree of tautness in the chain 48, the angular position of the bell crank lever 51 being adjustable, as at 52, for this purpose. It will be apparent that any other suitable chain tightening device might be employed for this purpose.

From the foregoing description it is believed that the operation of the adjusting mechanism will be readily apparent. When it is found that, due to wear or other causes, the friction elements 24 do not engage the clutch surface 17 with the requisite pressure, it is only necessary to apply a suitable tool to the squared end 47 of one of the sprocket shafts 44 and rotate the latter in the direction which will cause the associated eccentric pivot 33 to move the adjacent end of the associated cam lever 32 outwardly. By this operation the chain 48 will be driven to cause the remaining sprockets 45 and shafts 44 to rotate similarly, thus effecting a similar adjustment in the position of the other cam levers, and causing a corresponding increase in the pressure exerted upon the clutch surface 17 by the respective friction elements 24. Adjustment in the opposite direction may be effected by reversing the operation, in the event that, for any reason, the pressure between the friction elements and the clutch surface becomes too great.

It will be apparent that the adjusting mechanism of the present invention may be employed in connection with devices other than clutches and brakes, in which a plurality of elements, arranged in a closed series, require simultaneous and uniform adjustment. Many such applications will occur to those skilled in the art to which the present invention relates.

Having thus described the invention, what is claimed as new and desired to be secured by Letters Patent is:

1. In a clutch mechanism, a driving member, a driven member having a clutch surface, and means carried by said driving member for operatively connecting said driving and driven members, said means comprising a plurality of friction elements carried by said driving member and movable into engagement with said clutch surface, means for simultaneously moving said friction elements into engagement with said clutch surface, said last means comprising compression members associated with said friction elements and extending toward the center of said driving member, levers pivoted on the inner ends of said compression members and adjustably pivoted on said driving member, and means for simultaneously rocking said levers to move said compression members outwardly, and means for simultaneously adjusting the pivotal connections between said levers and said driving member to alter the throw of said levers.

2. In a clutch mechanism, a driving member, a driven member having a clutch surface, and means carried by said driving member for operatively connecting said driving and driven members, said means comprising a plurality of friction elements carried by said driving member and movable into engagement with said clutch surface, means for simultaneously moving said friction elements into engagement with said clutch surface, said last means comprising compression members associated with said friction elements and extending toward the center of said driving member, levers pivoted on the inner ends of said compression members and eccentrically pivoted on said driving member, and means for simultaneously rocking said levers to move said compression members outwardly, and means for simultaneously rotating said eccentric pivots to alter the throw of said levers.

3. In a clutch mechanism, a driving member, a driven member having a clutch surface, and means carried by said driving member for operatively connecting said driving and driven members, said means comprising a plurality of friction elements carried by said driving member and movable into engagement with said clutch surface, means for simultaneously moving said friction elements into engagement with said clutch surface, said last means comprising compression members associated with said friction elements and extending toward the center of said driving member, levers pivoted on the inner ends of said compression members and eccentrically pivoted on said driving member, and means for simultaneously rocking said levers to move said compression members outwardly, and means for simultaneously rotating said eccentric pivots to alter the throw of said levers, said eccentric pivot rotating means comprising toothed means associated with each of said pivots and an endless chain engaging all of said toothed means.

4. In a clutch mechanism, a driving member, a driven member having a clutch surface, and means carried by said driving member for operatively connecting said driving and driven members, said means comprising a plurality of friction elements carried by said driving member and movable into engagement with said clutch surface, means for simultaneously moving said friction elements into engagement with said clutch surface, said last means comprising compression members associated with said friction elements and extending toward the center of said driving member, levers pivoted on the inner ends of said compression members and eccentrically pivoted on said driving member, and means for simultaneously rocking said levers to move said compression members outwardly, and means for simultaneously rotating said eccentric pivots to alter the throw of said levers, said eccentric pivot rotating means comprising a worm wheel secured on each of said pivots, a shaft journalled on said driving member adjacent each said pivot and having a worm in mesh with said worm wheel, a sprocket secured on each said shaft, and an endless chain meshing with all of said sprockets.

5. A device according to claim 4, at least one of said shafts having a tool engaging portion, whereby said shaft may be gripped and rotated.

JOHN HART WILSON.